July 17, 1956　　　　　J. MULLER　　　　　2,754,973

FILTER CARTRIDGE FOR GASEOUS AND LIQUID FLUIDS

Filed July 2, 1953　　　　　　　　　　　　　2 Sheets-Sheet 1

INVENTOR
JACQUES MULLER
by
Young, Emery & Thompson
ATTORNEYS

July 17, 1956     J. MULLER     2,754,973
FILTER CARTRIDGE FOR GASEOUS AND LIQUID FLUIDS
Filed July 2, 1953     2 Sheets-Sheet 2

INVENTOR
JACQUES MULLER
BY Young, Emery & Thompson
ATTORNEYS

United States Patent Office 2,754,973
Patented July 17, 1956

2,754,973

FILTER CARTRIDGE FOR GASEOUS AND LIQUID FLUIDS

Jacques Muller, La Garenne-Colombes, France

Application July 2, 1953, Serial No. 365,729

Claims priority, application France October 8, 1952

3 Claims. (Cl. 210—169)

This invention relates in general to filters and more particularly relates to filter cartridges formed of stacks of discs axially clamped together.

The invention is directed to a filter cartridge consisting of a stack of filter discs of paper, cardboard, felt, ceramic material, or other filtering material, alternating with solid spacing or clamping discs of circular, square or other polygonal shape, slightly conical or plane, having a central opening and adapted to clamp the filter discs between them at the inner and outer peripheral edges, the combination of which with elastic or plastic rings, reinforced or otherwise, gives an absolutely homogeneous assembly.

In filter blocks of this kind, the ability of the clamping and spacing plates to follow closely the irregularities of the two surfaces and the inequalities of thickness of the filter discs is of primary importance to obtain uniform clamping around the entire periphery, compensation for defects of manufacture present in the plates or the filter material, and constant radial tension of the filter discs in spite of variations of thickness due to manufacture, the hygrometric state, the temperature, etc.

An object of this invention is to provide for filter cartridges of the type set forth, clamping and spacing plates having the qualities pointed out above.

Another object of the present invention is to provide a filter block of economical structure, simple to assemble, and using for the plates various materials such as metals, plastic or other materials which may be given various shapes without special tooling.

In principle, the invention consists in interposing between the clamping plates and the filter discs annular elastic or plastic gaskets or toroidal rings formed of a metal wire wound in helical coils and forming a toroidal coil spring.

Another object of the invention is to simplify the filter cartridge which is effected by eliminating the filter discs and substituting for each filter cell between two successive plates, a number of concentric toroidal coil springs clamped between the plates and having their convolutions sufficiently close to each other, leaving only gaps of determined dimensions for preventing passage of impurities contained in the fluids to be passed through the gaps.

Another object of this invention consists in making the adjacent convolutions of the concentric helical coils more closely spaced in the center of the cartridge than in the outer portions thereof if the filtering takes place from the outside to the inside, or conversely if the filtering takes place from the inside towards the outside.

Other features of the invention will be revealed in the following description taken in conjunction with the accompaying drawings, in which.

Figure 1:
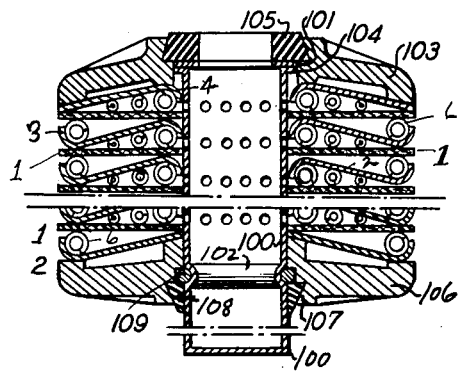
Figure 1 is a somewhat diagrammatical axial sectional view of a filter cartridge according to the invention.
Figure 1A:
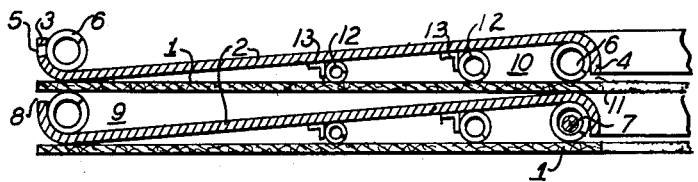
Fig. 1a is an enlarged fragmentary sectional view of the filter cartridge.

Figures 1 and 1a show a flat filter disc 1 of paper, cardboard, felt, ceramic or other filter material interposed between two clampnig plates 2 of solid relatively rigid material, for example, metal, plastic or the like. These plates are circular and slightly coned. If desired, the plates may be square or polygonal. All of the plates are provided with a central hole or opening. The number of filter discs and alternating clamping plates is determined according to the requirements of the filter cartridge containing the same.

Each plate has at its outer periphery a rim or flange 3 projecting from its convex face and at its inner periphery a rim or flange 4 projecting from its concave face. The flanges 3 and 4 may have perforations 5 or may be solid. In the inner angle or region formed between the rim 3 or 4 and the body of the plate is positioned an annular elastic spacer or gasket 6 shown in the present embodiment as a toroidal ring formed of a metal wire wound in the form of a helical coil spring. The diameter of the coil spring is slightly greater than the height of the flanges 3, 4. Each toroidal coil spring may, or may not, have a rigid reinforcing ring 7 positioned therein capable of preventing radial deformation in its own plane.

The filter discs 1 and the plates 2 have substantially the same diameter or the same transverse dimensions according to whether they are circular or otherwise. It will be seen that when the discs and plates are alternately stacked as shown in Fig. 1, each disc is located on one hand between the outer annular portion of the concave face of one plate and the elastic spacer or gasket bearing against the external flange and the outer portion of the convex face of the next plate, and on the other hand, between the inner annular portion of the convex face of said next plate and the gasket or spacer bearing against the internal flange and the inner portion of the concave face of the first plate.

The thickness of the elastic gasket or spacer ring is greater than the height of the flanges so that there is provided between the flanges and the filter disc a peripheral gap for the pasage of the filtered fluid or the fluid to be filtered. For example, assuming that filtering takes place from the outside toward the inside of the block, the fluid to be filtered enters at the outer peripheral gap 8 (and through the perforations 5 when these are present), and passes between the convolutions of the coils, more or less in mutual contact, of the outer toroidal coil spring 6 into the compartment 9. From compartment 9 the fluid flows through the filter disc 1 where it is freed from the impurities to be separated, and enters the compartment 10 from which it flows between the coils of the inner toroidal coil spring 6 and is discharged purified through the inner peripheral gap 11.

In use the discs 1 of filter material and the plates 2 may be assembled to form a filter cartridge as shown in Figure 1. For this purpose, the discs 1 and plates 2 are assembled on a perforated tube 100.

The tube 100 has at one end an external peripheral flange 101. At a certain distance from this flange, depending upon the length of the cartridge, there is formed in the circumference of the tube 100 a peripheral groove 102 of semi-circular or similar form. A top plate 103 has a central opening of a diameter equal to the external diameter of the tube 100 and has an annular groove 104 on its outer side for receiving the flange 101. This groove is enlarged outwardly to a central seat provided to receive a suitable gasket 105. The opposite or lower plate 106 is formed in similar manner, with a central opening provided with an annular recess 107 enlarged to a central seat for a gasket 108. The groove 102 is adapted to receive a split resilient ring 109, the outer diameter of which corresponds to that of the annular recess 107.

To assemble the cartridge, the top plate 103 is first placed on the tube against the flange 101, then the required number of discs 1, plates 2, and spacing rings 6 and 12 are mounted in appropriate order, and finally, the plate 106 is put in place. The assembly is actually compressed by pressure applied to one or the other of the end plates 103 or 106 until plate 106 has passed beyond the groove 102. The ring 109 is then threaded on the tube and caused to snap into place in the groove 102. The plate 106 is then released and receives the thrust due to the elasticity of the stack of filter discs, resilient spacer rings and plates, whereby the ring 109 becomes seated in the recess 102. The assembly is then positively locked in this position because the recess 107 prevents the ring 109 from expanding and becoming released from the groove 102. To disassemble, it is required first to axially compress the assembly in order to uncover the ring 109 which can then be removed.

When the filter block or stack of discs 1, rings 6 and plates 2 is axially compressed, which may be effected in any suitable manner, for instance as indicated above, the coils of the toroidal coil springs 6 are slightly compressed due to their elasticity, which elasticity enables them to yield more or less in accordance with the irregularities in the discs and plates, whereby each ring 6 generally conforms closely to the shape of the surface between which it is compressed, assuring perfectly uniform clamping of the filter discs.

While the spaced rings 6 have been shown and described as being toroidal helical coil springs of circular cross section, these rings may be annular coil springs of oval, square, oblong or other cross section.

To prevent displacement of a filter disc toward the interior of the compartment 10 and the action of the pressure of the fluid to be filtered, and forcing of the disc against the plate 2 thereby restricting the compartment 10 which might result in reducing the filtering capacity, there is provided inside the compartment 10 annular spacer means 12 which also may consist of toroidal coil springs similar to the spacers 6 and bearing against supports 13 fixed to the concave face of each plate 2.

Figure 2:
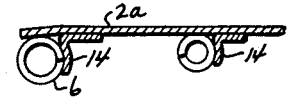
Fig. 2 is a detailed fragmentary sectional view of a modified form of structure.

Figure 2 shows a modification in the mounting of the spacer rings 6, which instead of being applied against the interior of the flange 3 and supports 13, bear against the outer surfaces of reversed supports 14.

Figure 3:
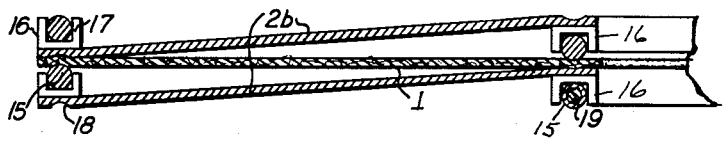
Fig. 3 is a sectional view similar to that of Fig. 1 of another modification.
Figure 4:
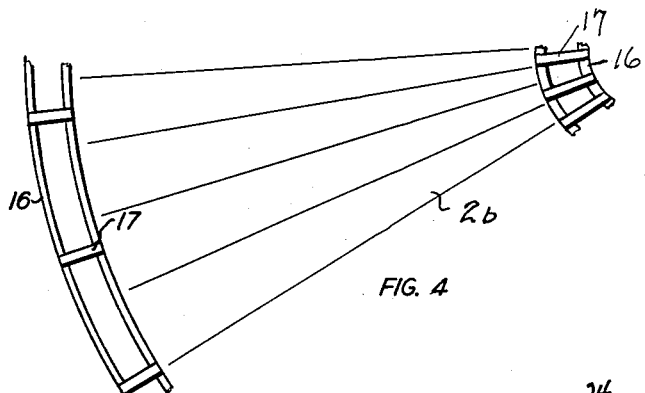
Fig. 4 is a partial plan view of one of the clamping plates of the modification of Fig. 3.

Figures 3 and 4 show a construction in which the spacer rings of metal wire are replaced by solid or hollow elastic cords 15 encased in a peripheral channel 16 which replaces the flange 3 of Figure 1. In this modification, the thickness of each cord 15 is greater than the depth of its channel. The cords may be impermeable to the fluid to be filtered so that it is necessary to provide flow orifices and passages in the channels which receive them. For this purpose, as shown in Figures 3 and 4, there is formed in the side flanges and bottom of each channel, grooves 17 distributed around the circumference of the plates. To stretch the filter discs and to increase sealing against penetration of the filter fluid directly into the outlet compartment 10, the plate in back of each channel 16 has a peripheral groove 18 into which the peripheral edge of the filter disc 1 is pressed by the cords 15 when the stack of discs and plates is compressed, as shown in Figure 3.

The annular cord 15 may have a solid reinforcing core 19 adapted to prevent its deformation in a radial direction.

Figure 6:
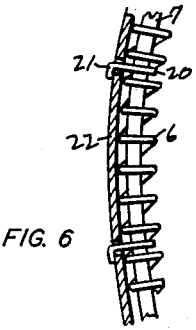
Fig. 6 is a section of line 6—6 of Fig. 5.
Figure 5:
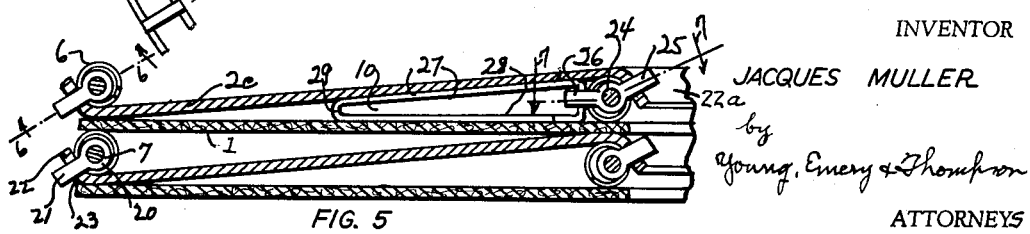
Fig. 5 is a partial cross section similar to Fig. 1a of a further modification.

Figures 5 and 6 show means for attaching the spacer rings to the clamping plates. This means requires the use of annular coil spring 6 containing a rigid reinforcing ring 7 on which are engaged at suitable intervals eyelets 20 having ears 21 which extend to the exterior of the coil spring between two consecutive convolutions. The clamping plates 2c are provided with a more or less inclined peripheral flange 22 in which are formed radial or axial slots 23. To fix the rings 6, the ear of each eyelet 20 is passed through one of the slots 23 until the rings 6 are applied against the interior face of the flange 22 and the projecting end of the ear is bent down against the external face of this flange as shown in Figure 6. It will be noted that this fixation means is very simple and effective.

Figure 7:
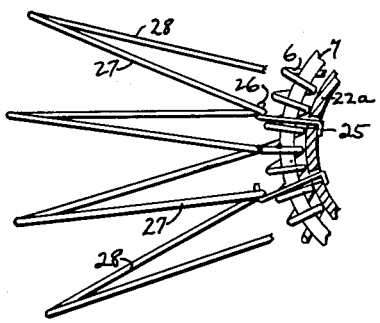
Fig. 7 is a section of line 7—7 of Fig. 5.

Figure 5 and 7 show another means for preventing displacement of the filter disc 1 by the thrust of the filter fluid. For this purpose, the inner spacer rings 6 are fixed to the plates 2c by means of eyelets 24 having two ears. One of these ears 25 is adapted to be attached to flange 22a while the other ear 26 projects between two consecutive convolutions of the annular coil spring toward the interior of the outlet compartment 10. This ear is adapted to be hooked onto the inner connection between metal wires 27 and 28 which extend radially toward the interior of the outlet compartment 10, and form a hairpin-like element, said arms being connected to each other by several loops 29. Actually, as shown, the wire portions 27, 28 and 29 are joined to form an annular helical coil of triangular cross section which fills the outlet compartment 10 and conforms closely to the shape of its cross section, thereby providing the filter disc 1 with a reinforcing support enabling it to resist deformation due to the pressure of the fluid.

Figure 8:
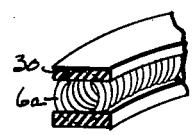
Fig. 8 is a detail of a modified clamping gasket.

In Figure 8 there is shown a composite gasket or spacer which is elastic and annular. The elastic annular gasket and spacer shown in Figure 8 is adapted for the clamping of filter discs of sheet metal or like which are not best suited to clamping directly by means of toroidal coils of metal wire. In this example, the toroidal coil spring 6a of metal wire is interposed between two rings 30 of the same diameter but made of rubber or like material into which the annular coil is partly embedded during molding. The rubber ring in contact with the sheet metal holds the latter better than the annular metal coil alone, and provides a better sealing, preventing direct passage of the filter fluid into the outlet compartment. Also it is better adapted to prevent the sheet metal from displacement under action of the pressure of the fluid.

Figure 9:
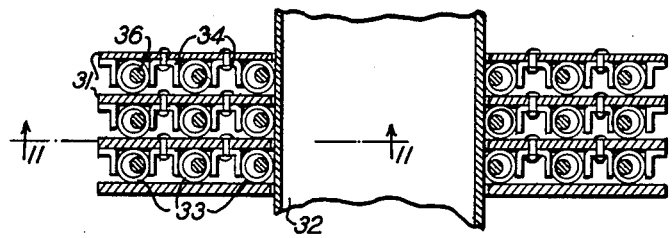
Fig. 9 is an axial section through several cells of the filter block according to a further modification.

In the construction shown in Figure 9, the filter block comprises a stack of a certain number of flat solid plates 31 which may be circular, square or other polygonal shape, each having a central opening by means of which they are stacked on a tube 32 slotted longitudinally or perforated with a large number of radial openings, from end to end. Between adjacent plates are interposed two or more annular spacers 33 of toroidal helical spring having a predetermined number of convolutions for providing the desired dimensions of flow passage between adjacent convolutions. All of the spacing rings are concentric with the axis of the center tube 32. The assembly is clamped in the usual manner against a stop at one end of the tube by means of a nut, not shown, screwed on the other end of the tube or in the manner shown in Figure 1. The plates 31 thus form between them a certain number of annular cells communicating with each other through the spaces between adjacent convolutions of the annular helical coils. According to the selected spacing between the convolutions of the coils, the gaseous or liquid fluid which it is desired to filter will pass while the more or less fine impurities which this fluid may contain will be retained and separated.

The annular coils may be held in place by any suitable means. In the illustrated example, they are held between guide stops 34 fixed in several radial rows, or in any other manner, all about the opening on one face of each clamping plate. These guide stops 34 are in the form of U-pieces fixed to the plate by a rivet and the annular spacer coils are engaged between the legs of consecutive U-pieces. The height of the guide stops must be less than the external diameter of the coils so that the stops will not come in contact with the opposite plate when the filter cartridge is compressed.

Figure 11:
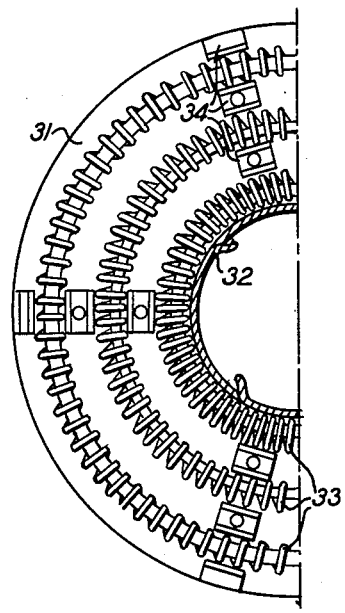
Fig. 11 is a transverse section at line 11—11 of Fig. 9 taken in the direction of the arrows.

If the filtering is to take place from the exterior to the interior of the block, there may be used a coil construction as shown in Figure 11 in which the convolutions of the toroidal coils are disposed closer to each other in one coil relative to another in the direction from the outer coil toward the innermost coil. The first toroidal coil which the fluid encounters on leaving the outer circumference therefore will hold back the coarse particles, the second toroidal coil will hold back particles of lesser size and each succeeding toroidal coil will hold back progressively finer particles. In this manner, there is obtained a progressive extraction of impurities at the different toroidal coils.

Figure 10:
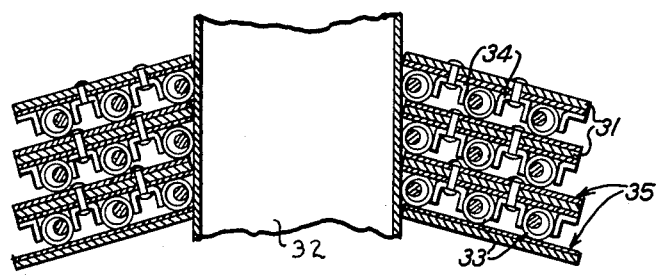
Fig. 10 is a similar view of a modified construction.

The arrangement shown in Figure 10 is similar to that of Figure 9 except that the clamping plates 31 are slightly conical. In a filter block or cartridge with vertical axis and intended for filtering from the interior toward the exterior, the plates may be mounted in such a manner that their faces are inclined and descend toward the exterior. If the filter is used for filtering a liquid or a wet gas, the impurities can flow towards the exterior on the plates and will be finally disposed at the bottom of the casing or vessel in which the filter block or cartridge is mounted.

To prevent the impurities from passing between the toroidal coils and the plates at the points of contact of the coils, there may be applied against the two faces of the plate a flexible gasket 35, for example, of rubber.

As long as they are not clamped between the plates, the toroidal coils are liable to deformation, which deformation can be prevented by incorporating a rigid ring 36 therein.

Obviously, it is possible to vary the details of the clamping plates and spacing or sealing rings without exceeding the scope of the invention. For example, the toroidal helical coils may be replaced by other annular elements which allow the filter fluid to pass while holding back the impurities. In this case, it is also possible to use in each filter cell of the block several annular filtering elements of permeability decreasing in the direction of filtering.

I claim:
1. A filter cartridge for filtering liquid and gaseous fluids comprising a stack of solid annular and slightly coned plates, means for axially clamping the plates together, inner spacing rings in the form of ring-shaped coil springs clamped between the inner marginal portions of the plates, outer spacing rings in the form of ring-shaped coil springs clamped between the outer marginal portions of the plates, means for holding the spacing coil springs in position, and annular discs of filter material inserted with their inner margin between the inner spacing coil springs and the convex side of the plates, and with their outer margin between the outer spacing coil springs and the concave side of the plates.

2. A filter cartridge for filtering liquid and gaseous fluids comprising a stack of solid annular and slightly coned plates, means for axially clamping the plates together, inner spacing rings in the form of ring-shaped coil springs clamped between the inner marginal portions of the plates, outer spacing rings in the form of ring-shaped coil springs clamped between the outer marginal portions of the plates, a rib along the inner edge and on the concave side of the plates for holding the inner spacing rings in position, a rib along the outer edge and on the convex side of the plates for holding the outer spacing rings in position, and annular discs of filter material inserted with their inner margin between the inner spacing coil springs and the convex side of the plates, and with their outer margin between the outer spacing coil springs and the concave side of the plates.

3. A filter cartridge for filtering liquid and gaseous fluids comprising a stack of solid, annular and slightly coned plates, means for axially clamping the plates together, inner spacing rings in the form of ring-shaped coil springs clamped between the inner marginal portions of the plates, outer spacing rings in the form of ring-shaped coil springs clamped between the outer marginal portions of the plates, a rib along the inner edge and on the concave side of the plates for holding the inner spacing rings in position, a rib along the outer edge and on the convex side of the plates for holding the outer spacing rings in position, said ribs having an axial height less than the diameter of the coils of the spacing rings, and annular discs of filter material inserted with their inner margin between the inner spacing coil springs and the convex side of the plates, and with their outer margin between the outer spacing rings and the concave side of the plates.

References Cited in the file of this patent

UNITED STATES PATENTS

| 1,332,996 | Perry | Mar. 9, 1920 |
| 2,452,486 | O'Meara | Oct. 26, 1948 |
| 2,658,624 | Redner | Nov. 10, 1953 |
| 2,699,260 | Komline | Jan. 11, 1955 |

FOREIGN PATENTS

| 161,639 | Great Britain | Apr. 5, 1921 |
| 520,633 | Great Britain | Apr. 30, 1940 |